ROBERT L. GREENE
HUGH O. BROWN
INVENTORS

United States Patent Office 3,484,359
Patented Dec. 16, 1969

3,484,359
ELECTRODE HOLDER
Robert L. Greene, Diamond Bar, and Hugh O. Brown, Fullerton, Calif., assignors to Beckman Instruments, Inc., a corporation of California
Filed Dec. 22, 1966, Ser. No. 603,993
Int. Cl. C23b 5/70; B01k 3/04
U.S. Cl. 204—195                                4 Claims

ABSTRACT OF THE DISCLOSURE

An apparatus for holding a plurality of electrodes comprising a body having a plurality of spherical cavities in which there are mounted resilient balls. The electrodes are frictionally mounted within passages extending through the balls. The balls are movable within the cavities so that the angular position of the electrodes may be readily varied, thus permitting the tips of the electrodes to be rapidly moved to any desired position. The apparatus is particularly useful for mounting ion measuring electrodes utilized for performing electrochemical titrations.

---

This invention relates generally to an apparatus for holding an electrode and, more particularly, to an apparatus for holding a plurality of electrodes in various positions in connection with electrochemical analyses of solutions.

While the electrode holding apparatus of the invention is described herein in connection with potentiometric titrations, it is understood that the apparatus may be used for holding electrodes other than potentiometric electrodes for any variety of purposes. In general, in potentiometric titrations a potentiometric sensing electrode and a reference electrode are immersed in a test solution contained in a beaker. While titrant is delivered to the test solution the potential of the sensing electrode is recorded as a function of titrant volume and the equivalence or end point of titration is assumed to be at the inflection point of the sigmoid curve plotted on the recorder chart. In some cases, means are provided to stop the delivery of titrant when the potential of the sensing electrode reaches a value corresponding to the equivalence point. Because of the delay in the mixing of the titrant and the test solution, appreciable time usually is required to attain chemical equilibrium. A stirring device is therefore usually mounted in the beaker to decrease the time in which chemical equilibrium is reached. However, when the test solution is stirred different portions of the solution are in different stages of titration, depending upon the location of the titrant delivery tip and the stirring path. Therefore, the position of the sensing electrode with respect to the delivery tip of the titrant feeding device is an important factor in rapid and accurate recording or control of titrations.

As discussed by Lingane in Electroanalytical Chemistry, 2nd edition, published by Interscience Publishers, Inc., New York, the delivery tip of the feeding device for the titrant and the sensing electrode are generally positioned quite close to each other and so oriented with respect to the direction of stirring that the sensing electrode is bathed by the test solution at a more advanced stage of titration than the solution in the bulk of the beaker. When the titration reaction proceeds rapidly the sensing electrode is placed very close to the delivery tip, that is, within 1 to 2 millimeters. With relatively slow reactions the spacing is increased to 1 to 2 centimeters to allow more time for the reaction to proceed as the solution travels from the delivery tip to the sensing electrode. Thus, it is desirable to have means for readily adjusting the position of the sensing electrode with respect to the delivery tip of the titrant feeding device. In addition, it is also desirable to position the tip of the reference electrode and also other sensing probes, such as a temperature probe, as close as possible to the ion sensitive portion of the sensing electrode in order to minimize any temperature or ion gradient between the electrodes.

It is, therefore, the principal object of the present invention to provide an apparatus for holding a plurality of electrodes in various positions.

Another object of the invention is to provide an electrode holder in which the vertical and angular position of an electrode may be readily varied with respect to the holder.

According to the prncipal aspect of the present invention, there is provided an apparatus for holding a plurality of electrodes comprising a body having a plurality of spherical cavities in which there are mounted resilient balls. The balls have passages therethrough in which electrodes are frictionally mounted. The balls are movable within the cavity so that the angular positions of the electrodes may be readily varied while the vertical position of the electrodes may also be varied rapidly due to the mere frictional contact between the electrodes and the balls in which they are mounted. By this arrangement, the tips of the electrodes may be rapidly moved to any desired position without utilizing screws, clamps or other holding devices as are employed in presently available electrode holders.

Other objects, aspects and advantages will become apparent from the following description taken in connection with the accompanying drawings wherein.

Figure 1:
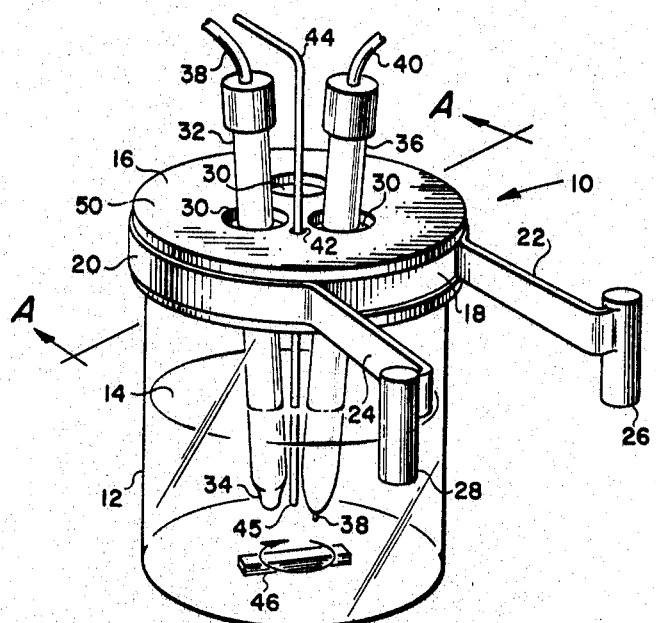
FIG. 1 is a perspective view of the electrode holding apparatus of the invention illustrated as being mounted on top of a beaker with two electrodes and a titrant feeding tube mounted in the holder and a mounting strap surrounding the body of the holder.

Referring now to the drawings in detail wherein like reference characters designate like parts throughout the various views, there is shown in FIG. 1 the electrode holding apparatus of the invention, generally designated by numeral 10, positioned on top of a beaker 12 containing the test or sample solution 14. The electrode holder 10 comprises a generally circular body 16 formed of an elastomeric material, preferably silicone rubber. A groove 18 is formed in the periphery of the body 16. A metal strap 20 is frictionally mounted in the groove 18 and includes a pair of arms 22 and 24 which extend outwardly from the body 16 and terminate in a pair of rods 26 and 28, respectively. The rods 26 and 28 may be mounted in a suitable supporting stand, not shown, which serves to support the electrode holder 10 in any desired vertical position.

The body 16 of the electrode holder has a plurality of vertical passages 30 passing therethrough in a vertical direction adapted to receive electrodes. As seen in FIG. 1, one of the passages 30 receives a potentiometric sensing electrode 32 having an ion sensitive bulb 34 at its lower end immersed in the test solution 14 while another passage 30 receives an electrochemical reference electrode 36 with a liquid junction 3 at its end immersed in the test solution. The third passage 30 is adapted to receive a third electrode, such as a temperature probe. The sensing electrode 32 and reference electrode 36 are connected via cables 38 and 40, respectively, to a suitable pH meter or recording apparatus, not shown.

The body 16 of the electrode holder also includes a pair of small vertical passages 42, only one being shown in FIG. 1, which frictionally receives a titrant feed tube 44 having its delivery tip 45 immersed in the solution 14 adjacent to the ends of the electrodes 32 and 36. A stirring bar 46 is rotated by a rotating magnet under the beaker 12, not shown, in a manner well known in the art to cause rotation of the bar 46 to stir the solution in the beaker. When the stirring bar 46 is rotated in a clockwise direction, as shown by the arrow in FIG. 1, the titrant exiting from the delivery tip of the tube 44 will pass immediately over the ion sensitive bulb 34 which is desired when the titration reaction proceeds rapidly.

Figure 2:
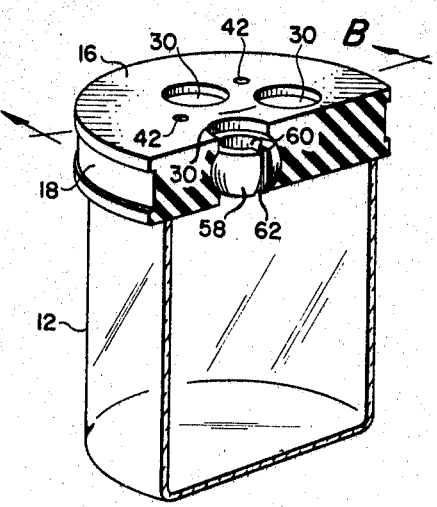
FIG. 2 is a sectional view along line A—A of FIG. 1 with the electrodes, titrant tube and mounting strap removed.
Figure 3:
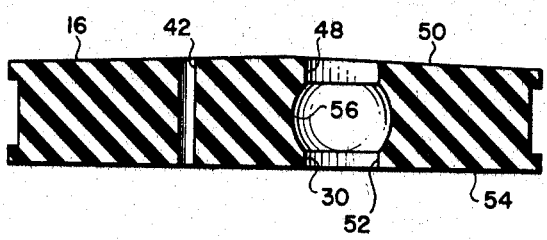
FIG. 3 is a vertical sectional view of the electrode holder in FIG. 2 taken along line B—B.

As stated above, the principal feature of the present invention is to provide means whereby the vertical and angular positions of the electrodes 32 and 36 may be readily varied with respect to the tip 45 of the titrant feeding tube 44. The arrangement for achieving this end is best seen in FIGS. 2 and 3 and includes the passages 30 each of which has an upper cylindrical port 48 which opens into the upper surface 50 of the body 16 and a lower cylindrical port 52 which opens into the lower surface 54 of the body. The passage 30 intermediate the ports 48 and 52 is shaped into the form of a spherical cavity 56 of greater diameter than that of the ports 48 and 52. Mounted in the cavity 56 is a ball 58 which has an opening 60 therethrough substantially aligned with the passage 30 in the body which is adapted to frictionally receive the cylindrical shank of an electrode, such as the sensing electrode 38 in FIG. 1. The ball 58 is preferably formed of a low friction material, such as polytetrafluoroethylene (Teflon) which readily slides in the cavity 56. The ball 58 is made slightly resilient by the fact that it includes a vertical slot 62 which extends from the opening 60 to the outer usrface of the ball. Due to the resiliency of the ball 58 and of the elastomeric body 16, the ball may be pushed by hand into either the port 48 or 52 into the cavity 56. The diameter of the ball 58 is slightly less than that of the cavity 56 so that when there is no electrode mounted within the opening 60 in the ball the surface of the blal engages the wall of the cavity with moderate frictional contact.

In use of the electrode holder 10 of the invention, an electrode which has a diameter slightly greater than that of the opening 60 in the ball is pushed through the opening until the tip of the electrode is in the desired vertical position. When the electrode is pushed through the opening 60, the resilient ball 58 expands slightly to cause the surface of the ball to engage the wall of the cavity with tight frictional contact yet, due to the nonfriction character of the polytetrafluoroethylene material of the ball, the position of the electrode mounted in the ball may be readily varied by merely pushing the top of the electrode laterally causing the ball 58 to rotate in the spherical cavity 60. Once the electrode is in the desired position, it is released and the friction between the wall of the cavity and the ball 58 retains the electrode in such position.

While it is preferable for manufacturing purposes that the ball 58 be formed of a nonfriction material such as polytetrafluoroethylene and the body 16 of an elastomeric material such as silicone rubber, it is understood that the invention contemplates a structure wherein the body 16 is formed of a nonfriction plastic such as polytetrafluoroethylene and the ball 58 is formed of rubber. In this case, merely a passage 60 is provided through the ball 58 while the slot 62 may be eliminated. In this arrangement, the rubber ball can be pressed by hand into the cavity 56 of the plastic body 16 and an electrode forced through the opening 60 in the rubber ball causing the ball to expand and tightly engage the walls of the cavity.

It is understood that the use of the electrode holder is not limited to potentiometric titrations but may be utilized to mount one or more sensing probes or the like in any type of monitoring or measuring system.

Although only two embodiments of the invention have been disclosed herein for purposes of illustration, it will be understood that various changes can be made in the form, details, arrangements and proportions of the various parts in such embodiments without departing from the spirit and scope of the invention as defined by the appended claims.

What is claimed is:

1. An apparatus for holding an electrode in various positions comprising:
   a body element having upper and lower surfaces;
   said body element having at least one passage therethrough opening at said upper and lower surfaces providing a pair of upper and lower ports;
   said passage being shaped to provide a spherical cavity between said pair of ports, the diameter of said cavity being greater than that of said ports;
   a resilient ball element frictionally mounted in said cavity, said ball element having an opening therethrough substantially aligned with said ports and being adapted to frictionally receive an electrode whereby the vertical and angular position of said electrode may be readily varied; and
   said ball element having a slot therein aligned with said opening in said ball element, said slot extending from said opening to the outer surface of said ball element, and said body element being formed of an elastomeric material so that the ball element may be pushed through one of said ports into said cavity.

2. In an apparatus for a titration process, the combination of:
   a beaker for holding the solution being titrated;
   an electrode holder above said beaker;
   said electrode holder comprising a body having an upper and lower surface;
   said body having a plurality of passages therethrough opening at said upper and lower surfaces providing pairs of upper and lower ports;
   each of said passages being shaped to provide a spherical cavity between each pair of said ports, the diameter of each of said cavities being greater than that of said ports;
   a resilient ball frictionally mounted in each of said cavities, said ball having an opening therethrough substantially aligned with said ports;
   a sensing electrode and a reference electrode frictionally mounted in the openings of two of said balls with the ends of said electrodes positioned in said beaker for immersion in the solution being titrated;
   said body having at least one additional passage therethrough opening at said upper and lower surfaces; and
   a tube extending through said additional passage for delivering titrant to said solution.

3. An apparatus for holding an electrode in various positions comprising:
   a body element having upper and lower surfaces;
   said body element having at least one passage therethrough opening at said upper and lower surfaces providing a pair of upper and lower ports;
   said passage being shaped to provide a spherical cavity between said pair of ports, the diameter of said cavity being greater than that of said ports;
   a resilient ball element frictionally mounted in said cavity, said ball element having an opening therethrough substantially aligned with said ports and being adapted to frictionally receive an electrode whereby the vertical and angular position of said electrode may be readily varied; and
   a groove in the periphery of said body element and a strap mounted in said groove, said strap including a pair of arms extending outwardly from said body element for attachment to a support.

4. An apparatus for holding an electrode in various positions comprising:

a body element having upper and lower surfaces;
said body element having at least one passage therethrough opening at said upper and lower surfaces providing a pair of upper and lower ports;
said passage being shaped to provide a spherical cavity between said pair of ports, the diameter of said cavity being greater than that of said ports;
a resilient ball element frictionally mounted in said cavity, said ball element having an opening therethrough substantially aligned with said ports and being adapted to frictionally receive an electrode whereby the vertical and angular position of said electrode may be readily varied; and
said body element being formed of silicone rubber and said ball element being formed of polytetrafluoroethylene.

References Cited

UNITED STATES PATENTS

| | | | |
|---|---|---|---|
| 424,572 | 4/1890 | Painter | 248—40 |
| 2,499,852 | 3/1950 | Dietz | 204—195.1 |
| 2,895,130 | 7/1959 | Klancnik | 343—702 |
| 3,286,963 | 11/1966 | Bergman | 248—316.5 |

JOHN H. MACK, Primary Examiner

T. TUNG, Assistant Examiner

U.S. Cl. X.R.

204—286, 297; 248—40, 316